United States Patent [19]

Sprung

[11] 4,162,696
[45] Jul. 31, 1979

[54] SUPPORT FOR A CAMERA

[75] Inventor: Jürgen Sprung, Brunswick, Fed. Rep. of Germany

[73] Assignee: Rollei-Werke Franke & Heidecke, Brunswick, Fed. Rep. of Germany

[21] Appl. No.: 892,152

[22] Filed: Apr. 3, 1978

[30] Foreign Application Priority Data

Apr. 2, 1977 [DE] Fed. Rep. of Germany ....... 2714871

[51] Int. Cl.² .............................................. B65B 11/00
[52] U.S. Cl. .................................. 150/52 J; 248/346
[58] Field of Search ....................... 150/52 R, 52 J; 206/316; 248/49, 102, 346

[56] References Cited

U.S. PATENT DOCUMENTS

| 2,223,219 | 11/1940 | Mayerovitz | 150/52 J |
| 2,748,822 | 6/1956 | Hepting | 150/52 J |

FOREIGN PATENT DOCUMENTS 2116244  5/1972  Fed. Rep. of Germany .......... 150/52 J Primary Examiner—Ro E. Hart
Attorney, Agent, or Firm—Ernest F. Marmorek

[57] ABSTRACT

A deformable camera case, alternatively usable as a camera stand, includes a wall in the form of a flexible cushion preferably filled with a plurality of small balls, that constitutes a pliable body capable of adjusting its shape to the contours of an object suitable for supporting the camera in a desired stable position.

11 Claims, 10 Drawing Figures

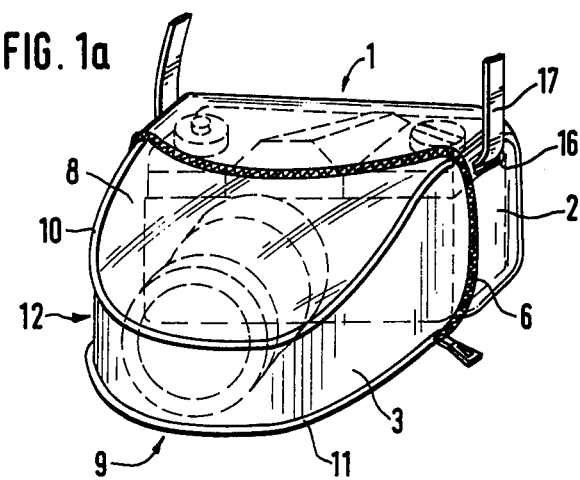
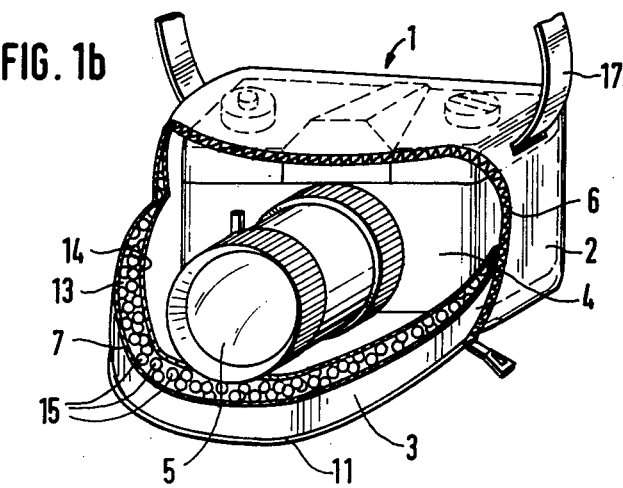

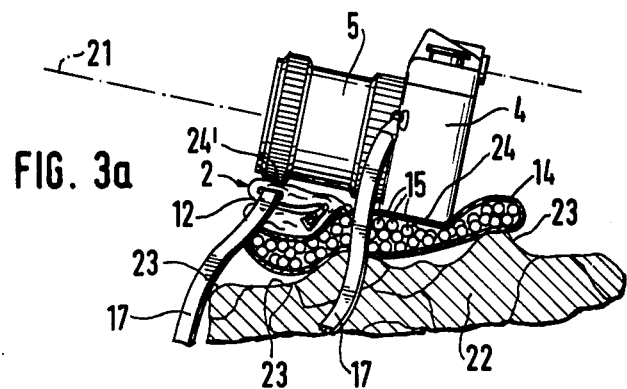
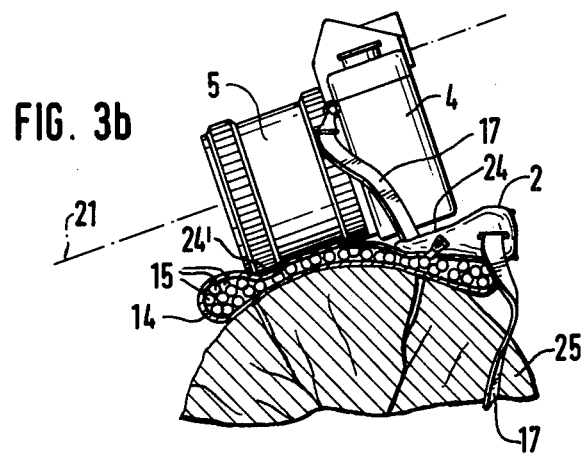
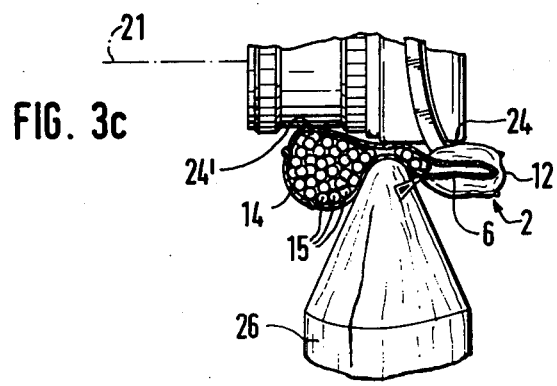

SUPPORT FOR A CAMERA

BACKGROUND OF THE INVENTION

The present invention relates generally to camera stands or stand-like supports.

In taking photographs at low light levels, or in special photographic shots at a close range and, in any case, in self-release photography, a camera user needs a firm support for his camera, such as a tripod. Tripods, however, always require a certain preparation time for their unfolding. For outdoor photography, the additional transportation of a tripod is often very tiresome. The effort to find suitable surfaces as a substitute support is mostly doomed to failure, since such substitute surfaces which are at hand are mostly uneven or inclined in a wrong direction. In any event, the correct choice of the camera with respect to the object to be photographed, on one hand, and any available substitute support for the camera, on the other hand, may be frequently very time-consuming or strenuous.

A suggestion has been made for filling an old sock with dried peas, against which a camera can be wedged on the back of a chair, or against a wall, so as to achieve a rigidity sought after, but seldom achieved by even the most hefty tripods. This suggestion refers, however, to an arrangement external to a camera case, and does not combine a camera stand and a camera case, as is the case in the present invention.

SUMMARY OF THE INVENTION

It is, therefore, an object of the present invention to provide an auxiliary support or stand for a camera which permits a user to exactly adjust the position of the camera with respect to an object to be photographed, even if the available supporting surface is irregular and has an inclination which is unsuitable for photographing the object.

Another object of the present invention is to provide an auxiliary stand or support for a camera without a user having to carry any additional load during transportation of the camera.

Still another object of this invention is to provide a stand that is continuously ready and which requires a minimum effort to get it into a ready-to-photograph condition.

According to the present invention, the above objects and others which will become apparent hereinafter, are attained by providing a combined camera stand and camera case, including a cushion-like member forming a wall of the camera case, and wherein the cushion-like member has a pliability and thickness adequate for adjusting its shape to the contours of an object suitable for supporting the camera, and resisting change sufficiently for retaining its adjusted shape, until manually adjusted and, alternatively, for pliably accommodating the camera in the case.

Thus, at least part of the camera has a cushion-like structure, namely two facing flexible wall portions connected along their perimeter with a flexible continuous wall portion defining, with the two facing wall portions, a hollow space in such a manner that the distance of the two facing wall portions can be arbitrarily changed, and that the hollow space is at least partially filled with a substance having a changeable outer shape and which is spatially extensible. The shapeless filling in connection with the hollow adjustable space extending between the two wall portions of a part of the camera case makes it possible to use almost any surface as a support for the camera, on one hand, and, on the other hand, permits a user to employ the cushion-like wall as a functional part of the case, as soon as the camera is inserted thereinto, without disturbing the user, since the pliable filling can be shifted into spaces of the case unoccupied by the camera.

According to one embodiment of the present invention, the filling consists of a plurality of small particles which can be arbitrarily shifted relative to each other, so that the handling of the camera casing forming simultaneously a stand-like support, is simplified, and a rapid and trouble-free change of the shape of the cushion-like wall of the case, following movement thereof from one irregular supporting surface to another surface, can be easily achieved. In this manner, it is possible to level instantly irregularities of any kind or form of the supporting surface, since each of the small particles in the cushion is, naturally, smaller than the contour of the uneven surface, such as a wall or a tree trunk.

On the other hand, the particular shape of the small particles is critical, so that the shape of the cushion-like wall of the camera case quickly conforms to the supporting surface. This feature is attained in one embodiment of the present invention by the filling of the cushion-like wall consisting of small, round, or approximately round particles. In a preferred embodiment of the present invention, these small particles or balls have a smooth surface, and are preferably made of synthetic material, such as PVC hard foam material, so that the body formed of a plurality of such balls is easily deformable, and so that the resulting pliable part of the case can easily be adjusted to any arbitrary shape; the total weight of the case is thereby increased only insignificantly.

In still another embodiment of the present invention, there is employed a camera casing having a conventional front hood connected to a case body adapted for accommodating the camera. The front hood is connected to the case body by a zip fastener, extending along the front side edges of the case body. The zip fastener makes it possible, upon concluding any photography or picture-taking, to completely protect the camera case from any external influences, simply by closing the zipper. At the same time, the front hood, according to the present invention, is formed as a cushion, partially filled with hard PVC balls, which, due to the slidable quality of their surface, make the cushion-like front hood abut a camera part, in this case the camera objective, and tightly surrounds the same. In this manner, the filling of the cushion-like front hood protects the objective of the camera to a certain degree against any impacts from the outside.

The invention will now be explained in greater detail with reference to the accompanying drawings.

BRIEF DESCRIPTION OF THE DRAWINGS

The invention will be better understood with reference to the drawings, wherein

FIG. 1a is a perspective view of a combined camera case and stand, with the case in its closed position;

FIG. 1b is a perspective view similar to FIG. 1a, showing in a cutaway view, the cushion-like front hood of the case;

FIG. 3a shows a camera in a ready position for photography with its case employed as a camera stand;

FIG. 3b shows another type of supporting surface for the camera of FIG. 3a;

FIG. 3c shows an extreme case of a supporting surface for the camera of FIG. 3a;

FIG. 4a is a ready-to-use modification of the camera case of FIG. 1a; and

FIG. 4b shows a camera supported on the camera case serving as a stand, according to FIG. 4a.

DESCRIPTION OF THE PREFERRED EMBODIMENTS

Figure 2A:
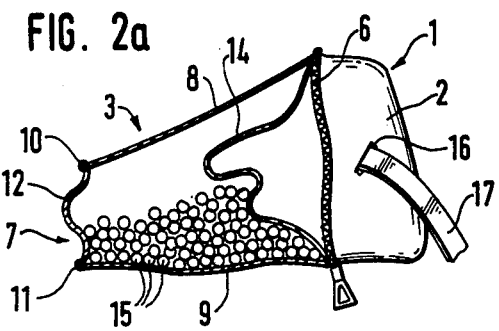
FIG. 2a is a side view, partly in section, of the camera stand and camera case in its closed position without a camera.

Referring now to FIG. 1a, there is shown a sketch of a combined camera stand and case 1 in its closed position, in which it serves primarily as a protective casing for the camera during its transport. For this purpose, the combined case 1 consists generally of a case body 2 and of a front hood 3. A camera 4 (FIG. 1b) is disposed within the case body 2, and the front hood 3 covers the projecting objective 5, that in the case of a reflex camera, may be of a considerable size. The case 1 is closed and opened by means of a zip fastener 6, for example.

According to the present invention, the camera casing 1 is combined with an auxiliary stand for holding the camera in a desired position on irregular supporting surfaces, in the event that a conventional stand such as, for instance a tripod, is not readily at hand.

In the embodiment shown in FIG. 1a and 1b, the camera case 1 is in the form of a bag having at least one part thereof, in this case the front hood, made of a very soft, thin and consequently extremely flexible material. Since, as shown in this example, the case body 2 is to be also employed as a support or stand for the camera, if necessary, it is advantageous to make the case body 2 also of such a soft material.

In particular, the front hood 2 includes an outer wall portion 7, consisting of a top surface 8, a bottom surface 9, and of an intermediate surface 11 extending around the perimeter of the bottom and top surfaces 8 and 9, and being inner-and connected thereto by straps or seams 10 and 11 bulging out from the case body 2. A second inner wall portion 14 protrudes into the pouch-like empty space defined by the outer wall portion 7. The total surface area of the inner wall portion 14 is smaller than that of the outer walls 7, so that an interface 13 is formed therebetween. The inner and outer wall portions 14 and 7 are connected to each other only on one side of the zip fastener 6. As seen from the broken-away section of the front hood in FIG. 1b, the inner space 13 is only partially filled with a freely movable filling. In this embodiment the filling consists of a plurality of small and smooth balls 15. Of course, it is also possible to use oval particles similar to rice kernels, for example; alternatively, and irrespective of its specific weight, a substance such as dried fruits could also be employed as the filling in the interspace 13 between the cushion, like inner-and outer-wall portions 14 and 7. The most advantageous filling consists, however, of small balls of a hard PVC foam, which balls, due to their low weight, hardly affect the total weight of the camera and the case. The small balls of the filling may have, for example, a diameter of about 3 to 4 mm. each.

The case body 2, forming an additional part of the camera case, is attached to the seam of the zip fastener 6, which is disposed opposite the front hood 6. The case body fits closely the configuration of the camera housing and surrounds the same almost in a form-filling manner. The walls of the case body 2 are formed as single layer walls. In contrast to the outer wall portion 7 of the front hood 3, the case body 2 is made of a stronger material which, nonetheless, retains sufficient flexibility so that it can be easily deformed by depression. On each side of the case there are provided outlet slits 16 for a carrying strip or belt 17 of the camera to project therefrom. The carrying slit 17 and its outlet slits 16 may be located either closer to the top or toward the center of the case body (FIG. 2a) depending on the center of gravity of the camera, so that the camera is carried with its objective projecting either forwards or downwards.

In FIG. 2a, an empty closed camera case 1 is illustrated in a side view, partially in section, and is similar to that shown in FIG. 1a; like component parts are denoted by like reference numerals. The case includes again a front hood 3 with its considerably collapsed outer wall 7 and its inner wall 14 loosely suspended from the upper seam of the zip fastener 6. In the lower space formed between the outer and inner walls there are loosely arranged the balls 15, filling the lower space approximately to one half of its volume, when a camera is not carried in the case.

Figure 2B:
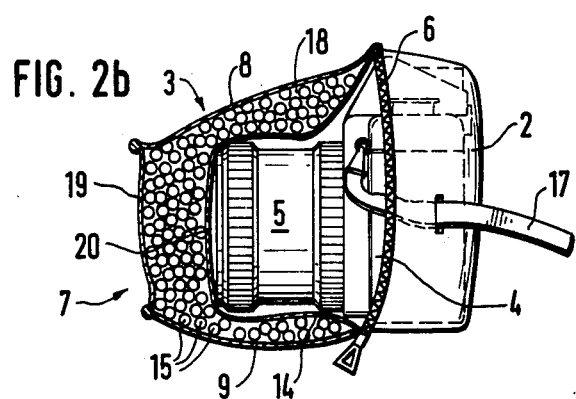
FIG. 2b shows the combined camera case and stand of this invention in its closed position with the camera having a short, or standard objective.

Upon insertion of the camera into the combined case 1, in FIG. 2b there being shown a camera with a relatively short standard objective, the part of the interspace 13 that is unoccupied by the objective becomes completely filled with the small balls 15. While the outer wall 14, due to its configuration, spans the area between the seams 10 and 11, and the zip fastener 6, the inner wall 14 abuts against the objective 5 in the remaining empty positions of the interspace 18, in proportion to the pressure exerted by the closed case against the objective. The ball filling thus surrounds the entire objective, and provides an additional protection against any impacts on the camera from the outside.

Figure 2C:
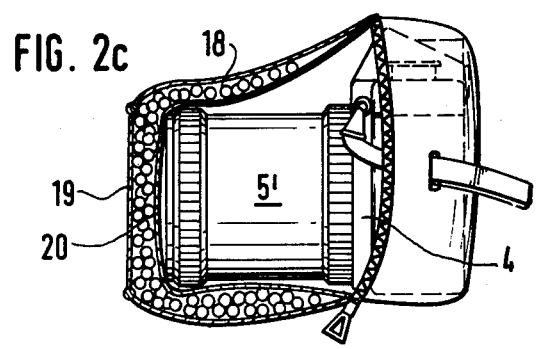
FIG. 2c is the combined camera stand and case according to FIG. 2a, in its closed position, with a camera equipped with teleobjective.

Upon a teleobjective being inserted into the camera, and upon both being inserted into the pouch-like case 1 (FIG. 2c), it is apparent that the longer objective 5 reduces the distance between the outer- and inner walls 7 and 14, especially in the front range thereof, in comparison to a short standard objective 5. Also the interspace 18 is not filled so densely with the balls, because the inner wall 14 is expanded more in a forward direction, and thereby becomes tauter.

In what follows there is described, with reference to FIGS. 3a-3c, the use of the combined camera case as a stand-like support of the camera. If the user pulls the inner wall 14 out of the pouch-like front hood 3 into the empty, but opened camera case 1, the volume of the empty space 13 between the outer and inner walls 13 is almost doubled. In this manner, the entire camera case with all its walls and components can be folded or compacted into any desired form, and due to its pliability, may assume almost any desired outer shape. As a result, when the pliable case is placed on an irregular or arbitrarily shaped support, such as a brick wall 22, for example, as shown in FIG. 3a, a brick wall surface inclined in the direction of the optical axis 21 of the camera, the cushion-like case wall, together with other case parts, are shaped by means of the pliable small balls, so as to fill any uneveness 23 of the brick wall. By slightly pressing upon the case, the balls in the cushion-like part permit the camera, that is located on the upper surface of the folded case, to take up any suitable position, and to obtain a stable support in the seat points 24 and 24'. As shown in FIG. 3a, in spite of the downward inclination of the brick surface 22, the optical axis 21 of the camera is directed upwardly towards an object to be photographed. The collapsed or folded case body 2 and the relatively stiffer outer side surfaces 12 thus form a support in the abutment seat 24' for the objective 5. The carrying strap 17 extends freely around the resulting stand-like support of the camera.

FIG. 3b shows an example of the application of the folded empty case as a stand-like support on a rounded log or tree trunk 25. The optical axis of the camera is here directed downwardly. The inner wall portion 14 of the cushion-like part has been pulled out of the front hood 3 of the case to form an abutment seat 24' for supporting the front of the camera objective, and the folded case body 2 levels the rearwardly sloping surface of the round log 25, and serves as an abutment seat 24 for the camera.

Finally FIG. 3c shows an extreme case wherein the camera is seated on a pointed post 26 with a forwardly directed optical axis 21. In this case it is important that very few, or no balls 15, be left in the range of the tip portion of the post, and that the outer- and inner-wall portions 7 and 14 be pulled away from each other, while the pliable filling and the folded parts of the case body 2 be arranged immediately around the tip portion of the post. In this manner a sufficiently large stand or support is attained for the bottom abutment edges and surfaces of the camera, so that the camera is securely resting on these edges and surfaces, even under such unfavorable conditions.

In all the above-discussed embodiments, both the camera and the case remain mutually connected by means of the carrying strip 17 passing through the outlet slits 16 even when an irregular supporting surface having been built up, when even the camera 4 is removed from the camera case 1. Consequently, upon the completion of the picture taking, both the case and the camera can be reliably and securely gripped again by means of the carrying strip.

Figure 4A:
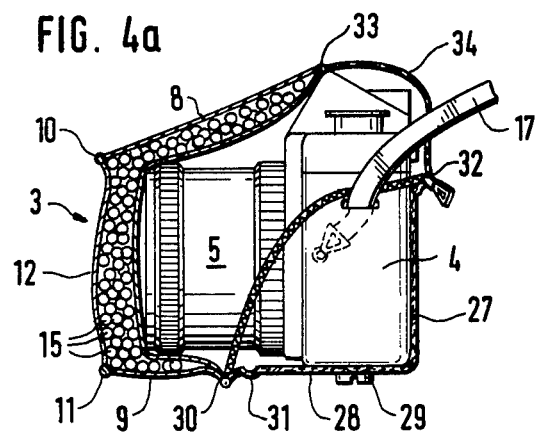

In FIG. 4a, another possible embodiment of the camera case in the form of a ready-to-use casing, is shown. A case body 27 made of a solid material, for example, case leather, is detachably connected by means of a zipper fastener 6 to a front hood 3. The structure of the front hood 3 corresponds generally to that described in the preceding examples shown in FIGS. 2a to 2c. The only departure is the transition from the solid case body 27 to the soft front hood 6 at the bottom 28 of the case. The case bottom 28 is first firmly screwed to the bottom of the camera by means of a screw 29 threaded to fit a conventional stand. Immediately next to the lower end 30 of the zip fastener 6, a predetermined folding line 31 is defined in the solid leather. The cushion-like or double wall front hood 3 formed with the interspace 13 adjoins the outer seam of the zip fastener. A covering hood 34 of the front hood 3 made of a soft leather adjoins the upper end of the seam 33 up to the double-walled front hood 3. The covering hood 34 facilitates a convenient tilting movement of the front hood 3, and upon the opening of the zip fastener, it can be swung forwardly over the upper part of the camera.

Figure 4B:
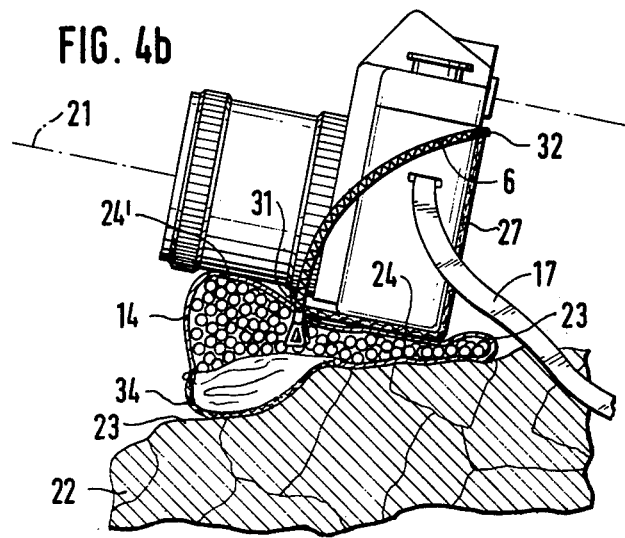

FIG. 4 shows a camera supported in a picture-taking position on an irregular brick wall surface 22 (corresponding to FIG. 3a). Upon opening of the case and pivoting of the front hood 3 about the predetermined folding line 31, and after pulling the outer and inner walls 7 and 14 away from each other, the case is spread out by means of the small balls 15 on the uneven brick wall surface 22. In the example shown (FIG. 4b), the camera is pressed into the pliable surface of the inner wall 14, while maintaining its optical axis directed upwardly. The cover hood 34 and the side surfaces 12 of the front hood 3 fill out, and level the irregularities 23 in the brick wall 22.

While the invention has been illustrated and described in several specific embodiments, it is not intended to be limited to the details shown, since various modifications and structural changes may be made without departing from the spirit of this invention.

What is claimed as new and desired to be protected by Letters Patent is set forth in the appended claims:

1. A combined camera stand and camera case, comprising in combination a cushion-like member forming a wall of the camera case, said cushion-like member having an adequate pliability and thickness for adjusting its shape to the contours of an object, being operative for retaining its adjusted shape until manually changed for supporting a camera, and alternatively for pliably accommodating the camera in said case, and including two end walls flexibly interconnected along their peripheries to define a hollow interspace therebetween, the volume of said interspace being arbitrarily changeable, and pliable means for filling at least part of said hollow interspace, said pliable means being changeable in shape and dimensions.

2. A combined stand and camera case as defined in claim 1 wherein said pliable means includes a plurality of relatively small particles shiftable with respect to one another.

3. A combined camera stand and camera case as defined in claim 2 wherein said particles are small balls.

4. A combined camera stand and camera case as defined in claim 3 wherein each ball has a smooth surface.

5. A combined camera stand as defined in claim 3 wherein said balls are composed of a synthetic plastic material.

6. A combined camera stand and camera case as defined in claim 5 wherein said synthetic plastic material is hard PVC foam.

7. A combined camera stand and camera case as defined in claim 1 wherein said cushion-like member forms a front hood of said camera case for covering a camera objective or lens.

8. A combined camera stand and camera case as defined in claim 7 further including a case body, said case body and said front hood being adapted to receive the camera, and further comprising a zip fastener connecting said case body and said front hood.

9. A combined camera stand and camera case as defined in claim 7 further comprising a case body detachably connectable to the camera, and a bottom portion formed with a predetermined folding line for at least partially collapsing said combined camera stand and camera case along said folding line, and wherein a portion of said front hood is connected to said case body.

10. A combined camera stand as defined in claim 9 wherein said camera case body is adopted for ready use and is composed of a firm material.

11. A combined camera stand as defined in claim 10, wherein said material is leather.

* * * * *